BEST AVAILABLE COPY

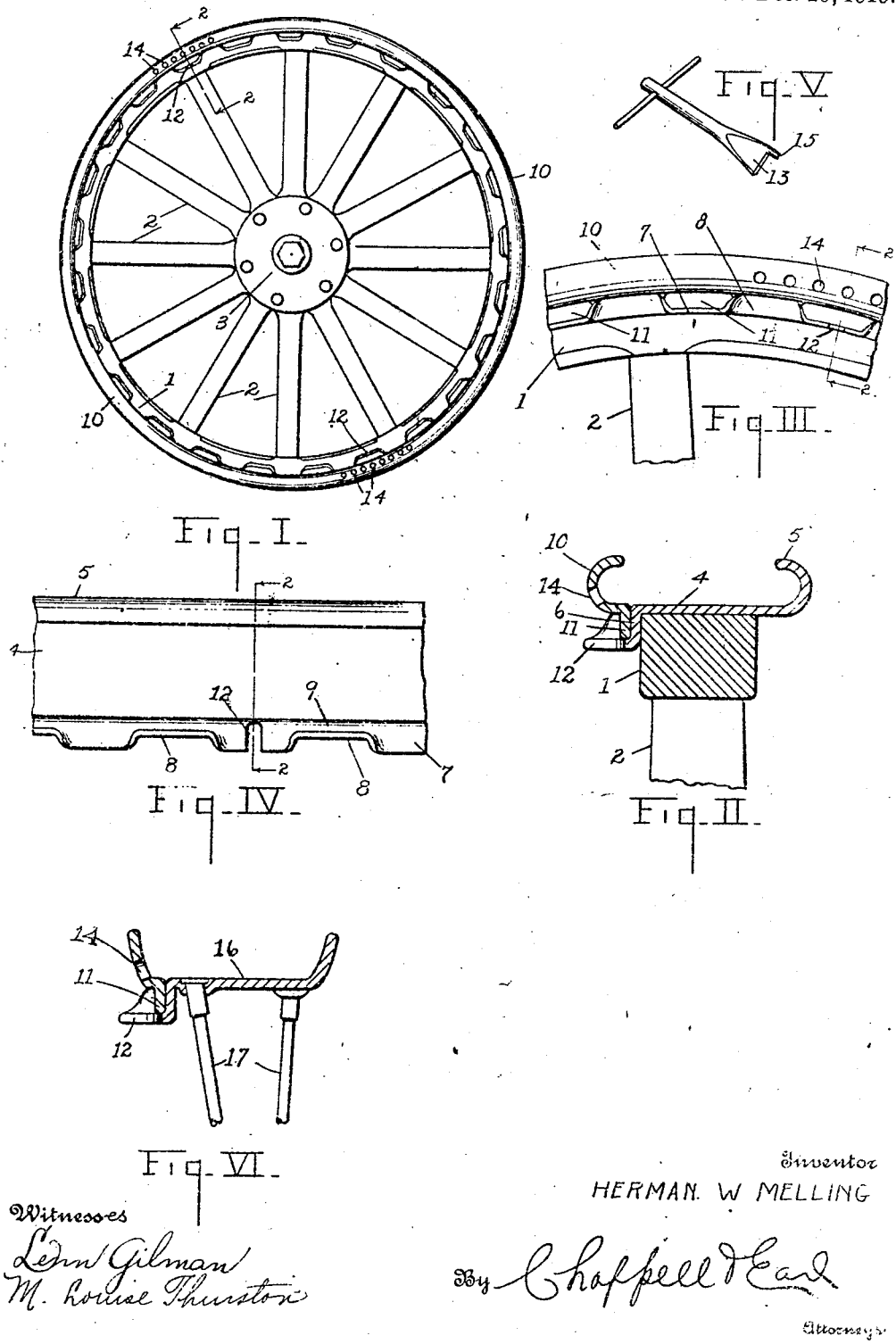

UNITED STATES PATENT OFFICE.

HERMAN W. MELLING, OF JACKSON, MICHIGAN.

WHEEL.

1,325,258.  Specification of Letters Patent.  Patented Dec. 16, 1919.

Application filed December 28, 1917. Serial No. 209,297.

*To all whom it may concern:*

Be it known that I, HERMAN W. MELLING, citizen of the United States, residing at Jackson, county of Jackson, State of Michigan, have invented certain new and useful Improvements in Wheels, of which the following is a specification.

This invention relates to improvements in wheels.

The main objects of this invention are:

First, to provide an improved rim for vehicle wheels which permits the quick and easy mounting or removal of the tire.

Second, to provide an improved tire rim which is very economical in structure and at the same time strong and durable and has no delicate parts.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a side view of a wheel embodying the features of my invention.

Fig. II is a detail section on a line corresponding to line 2—2 of Figs. I and III.

Fig. III is an enlarged detail side elevation.

Fig. IV is a detail plan view of one of the rim members.

Fig. V is a perspective view of a tool designed to assist in removing and placing the removable tire flange.

Fig. VI is a detail transverse section of a modification showing my improvements adapted to wire wheels and to cushion or straight sided tires.

In the drawing similar reference characters refer to similar parts throughout the several views, and the sectional views are taken looking in the direction of the little arrows at the ends of the section lines.

Referring to the drawing, 1 represents a felly, 2 the spokes, and 3 the hub of a motor vehicle, these parts being shown more or less conventionally.

The rim 4 is, in the structure illustrated, shown mounted directly upon and secured to the felly. The rim member 4 is provided with a permanent or fixed tire flange 5 at one edge, the flange in the structure illustrated being adapted for a clencher tire. At its other edge the member 4 is provided with an inwardly projecting flange 6 disposed against the side of the felly. The edge of this flange 6 is conformed into alternate connected laterally projecting lugs 7 and outwardly projecting lugs 8, the outwardly projecting lugs 8 being spaced from the flange 6 to provide rim lug seats 9.

The removable tire flange 10 has inwardly projecting lugs 11 formed on its inner edge and spaced so that they may be introduced between the lugs 8 and engaged with the seats 9 by rotative movement of the flange 10.

To facilitate this rotative adjustment one or more of the lugs 7 is provided with notches 12 adapted to receive the key-like tool 13. The flange 10 is provided with a series of holes 14 disposed adjacent to said notched lug so that the pin 15 of the tool may be engaged with the holes when the tool is engaged with the notches and the flange rotatively adjusted by a rotative movement of the tool.

The structure illustrated is adapted to be engaged simultaneously with two tools.

In the modification shown in Fig. VI the rim member 16 is connected directly to the wire spokes 17. The other parts are the same as those described, except mere modifications in the shape of the tire flanges.

A structure embodying my improvements may be manipulated very rapidly and easily for the application or removal of a tire. The structure is strong and durable and the parts are simple and economical to produce.

Having thus described my invention, what I claim as new and desire to secure by Letters Patent, is:

1. In a wheel, the combination of a rim mounted thereon and having a fixed tire flange at one side and an inwardly projecting flange at the other having its edge conformed into alternate connected laterally and outwardly projecting lugs, the outwardly projecting lugs being spaced from said flange providing tire flange lug seats, one of said laterally projecting lugs being notched to receive a tool, and a removable tire flange provided with spaced inwardly projecting lugs adapted to be introduced between the said outwardly projecting lugs and engaged and disengaged with said seats by rotative movement, said removable flange being provided with a series of holes positioned adjacent said notched lug so that a tool may be engaged therewith and with said notched lug to facilitate the rotative adjustment of said removable flange.

2. In a wheel, the combination of a rim mounted thereon and having a fixed tire flange at one side and an inwardly projecting flange at the other having its edge conformed into alternate laterally and outwardly projecting lugs, said lugs being joined at their ends, the outwardly projecting lugs being spaced from said flange providing tire flange lug seats, and a removable tire flange provided with spaced inwardly projecting lugs adapted to be introduced between the said outwardly projecting lugs and engaged and disengaged with said seats by rotative movement.

In witness whereof, I have hereunto set my hand and seal in the presence of two witnesses.

HERMAN W. MELLING. [L. S.]

Witnesses:
  NORMAN ETESLIE,
  J. J. JOHNSON.